United States Patent Office 2,823,152
Patented Feb. 11, 1958

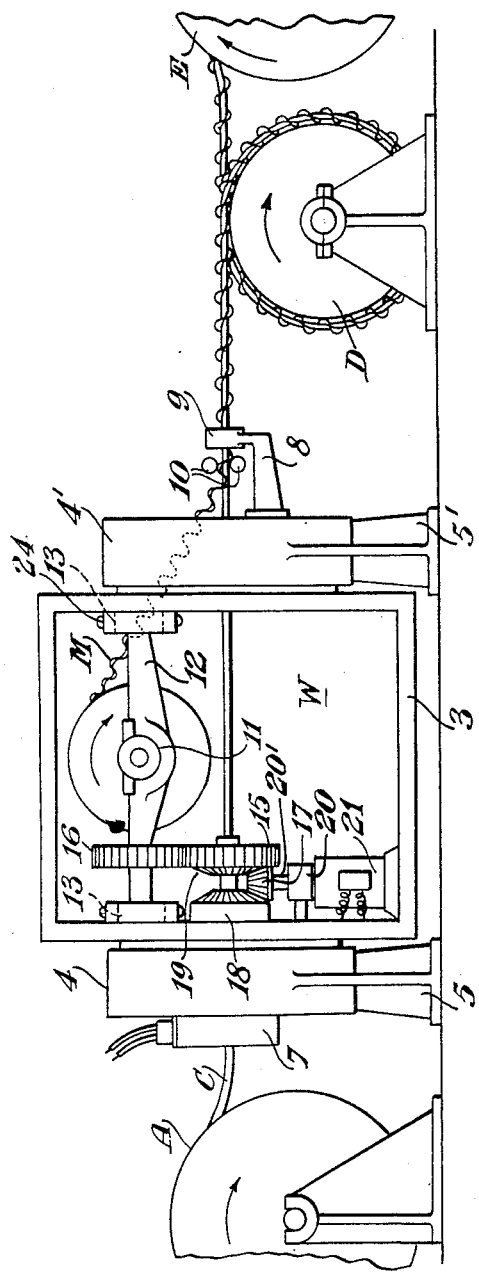

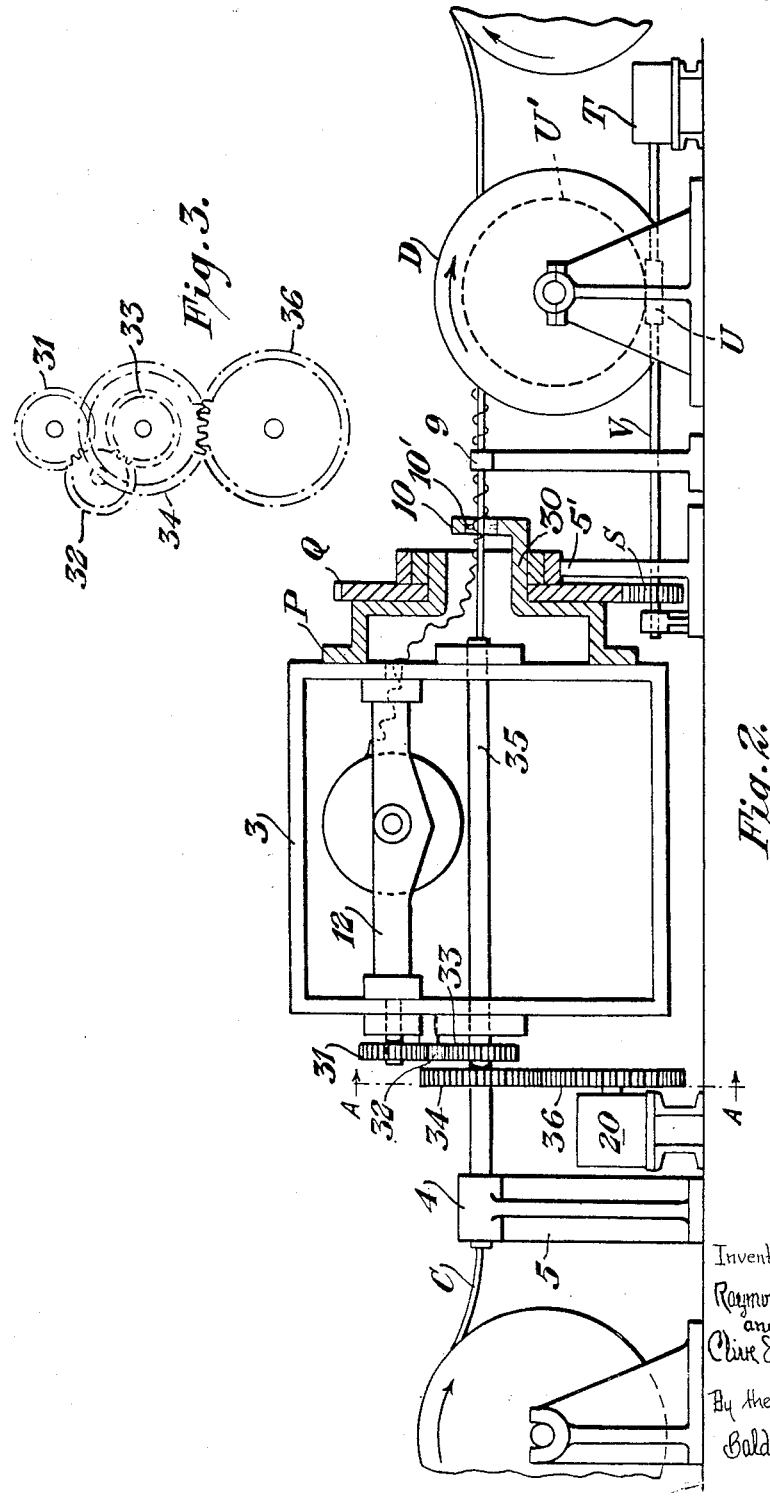

2,823,152

MANUFACTURE OF AIR SPACED ELECTRIC CABLES

Raymond Charles Mildner, Shirley, Oxhey, and Clive Edward Christopher Lovelace, Blackheath, London, England, assignors to Telegraph Construction & Maintenance Company Limited, London, England, a company of Great Britain Application May 4, 1951, Serial No. 224,555

Claims priority, application Great Britain May 16, 1950

4 Claims. (Cl. 154—2.26)

This invention relates to the manufacture of electric cables having an air space insulation.

In the specification of our prior U. S. Patent No. 2,599,857 we described a method for the manufacture of a helical membrane for use in the production of the air space insulation of an electric communication cable. According to this method, a layer of dielectric material of predetermined dimension is applied to a former and then cut helically to provide a membrane which after separation from the former can be extended on to a conductor to support the latter relative to an outer conductor coaxial therewith with a substantial air space between the two conductors. In an alternative application, the helical membrane is first slotted and then applied to a central support, the slots being used to receive and locate a plurality of conductors in spaced relationship to one another.

The present invention is concerned with a method and means of applying the helical membrane to the central conductor or support.

When a helix is extended, its inner and outer diameters are reduced and it will be found that if one end is fixed, the free end tends to twist. Such twisting is obviously not permissible in the case where the helix is applied to a conductor or support by rotating a helix supply bobbin about the advancing conductor or support: on the other hand lack of freedom to twist may result in instability and even collapse of the helix.

We have ascertained that it is possible to overcome this twisting of the helix by making the conductor or support, about which the helix is wrapped, with a diameter larger than the internal diameter of the unstretched helix. In this way there is applied to the stretched helix a bending moment in the plane of the membrane and this moment, coupled with the friction between the inside surface of the membrane and the conductor, causes it to adhere in a stable condition.

According to the present invention, in the manufacture of an air space cable having a helical membrane and wherein the membrane is applied in extended form, the respective dimensions of the inner diameter of the membrane when unstretched and of the conductor or support are so chosen that the dimension of the latter is not less than the inner bore of the unstretched membrane.

In practice, it will be found that it is sufficient to have a relatively small interference between the hole in the helix and the conductor in the finished cable.

According to a further feature of the invention, a machine for applying a helical membrane to a conductor or support in the manufacture of membrane spaced cables of the kind described, comprises a bobbin for carrying cut but unstretched membrane, said bobbin being supported in a rotary carriage in normally fixed relationship to the direction of feed of the cable to be insulated but which is mounted so as to be capable of relative adjustment to the axis of the cable, means for passing the conductor or support axially through said rotary carriage and means for lapping the helix uniformly and tightly around said conductor or support.

In spite of the fact that twisting of the helix is substantially prevented by means of this invention, minor variations in the dimensions of the cable components may cause some degree of twist, and the machine according to the invention, is therefore provided with means for accommodating such variations. For this purpose, means may be provided for varying the position of the membrane-carrying bobbin relative to the carriage.

The invention is illustrated in the accompanying drawing in which Figures 1 and 2 are diagrammatic elevations of machines for applying a helical membrane to the central conductor of an electric cable and Figure 3 is a detail view taken on the line A—A of Figure 2 of epicyclic gearing for imparting rotational movement to the bobbin or drum on which is carried the unstretched helical membrane.

In the drawing, A indicates a wind-off drum for a length of conductor C for use in the manufacture of the cable, W being a winding or lapping machine for applying a helical membrane M to the conductor, the conductor with the membrane thereon on leaving the lapping machine W then being given three or four turns around a capstan D before passing to a third drum E onto which the conductor with the helical membrane is finally wound.

In the method of applying the helical membrane to the conductor of this invention, in order to eliminate twist, due to the extension of the turns of the helix, which produces a reduction in the inner and outer diameters of the helix, the initial relative dimensions of the helix and the conductor are so selected that there is only a relatively small interference between the hole in the helix and the conductor in the finished cable.

In practice, it has been found that when the helix is stretched and applied to a conductor by winding it around the same, a bending moment is set up in the plane of the helix, which, coupled with the friction between the inner edge of the membrane and the conductor, causes it to remain in position on the conductor, in a position of equilibrium.

*Example.*—A tube of 0.645" outside diameter and 0.190" bore was cut into a helix having 25 cuts per inch. When stretched freely so that the length of lay was 0.625", the outer diameter was reduced to about 0.54" and the coil tightened itself by about 15%. It was found possible to wrap this helix round a conductor of 0.200" without imparting any twist to the helix.

In carrying out the invention, the uninsulated conductor is passed through openings in each end of a cage 3 mounted to revolve in gimbal or roller type mountings in frames 4, 4' carried on stands 5, 5', the cage being driven through a suitable pinion drive (not shown) controlled through a control box 7 carried by one of the frames 4.

The other frame 4' is provided with a bracket 8 supporting a guide 9 for the conductor and helix. Lapping rollers 10 located on two opposite sides of the conductor control and position the spacing between adjacent turns of the helix as it is wound on rotation of the cage 3 about the advancing conductor C.

A bobbin, containing the cut but unstretched helix, is freely supported in bearings 11 mounted in a carriage 12. The carriage 12 is mounted to rotate about an axis parallel to the axis of the conductor C in passing through the cage 3, being journalled at each end in bearing blocks 13 supported in housings 24 on the sides of the cage 3. Normally the plane of the bobbin remains vertical notwithstanding the rotation of the cage but provision is made for tilting it in either direction out of the vertical as described hereinafter.

In operation the conductor C is drawn off the drum A and over the capstan D onto the take-up drum E. In passing through the cage 3, the helix M, which is caused to stretch in being drawn off the bobbin, is lapped on to the conductor in passing between the rollers 10. Free rotation of the carriage 12 supporting the bobbin is normally prevented by means of sun and planet gearing, comprising intermeshing pinions 15, 16, the pinion 15 being mounted concentrically in relation to the axis of the conductor C, while the pinion 16 is fast on the carriage 12.

Provision is, however, made to impart a rotational movement to the pinion 15 and for this purpose on one side it is provided with a bevel pinion 19 for co-operation with a second bevel pinion 18, the pinions 19, 18 meshing with a third bevel pinion 17 fast on a shaft 20', driven by means of an auxiliary electric motor 20. The electric motor 20 with its gear 17 is supported by means of an annular rack on the side of the cage so that it is capable of rotating about the pinion 18. 21 is a controller for motor 20, so that the drive to the planet may be varied as required to meet operating conditions and to increase or decrease speed of rotation of the carriage in relation to the angular velocity of the cage 3. During the rotation of the cage the carriage 12 is itself rotated by the sun and planet gear in order to cause it to remain always in a vertical plane, except for any auxiliary corrective rotation which may be applied by means of the motor 20 to tilt it in one or other direction out of this plane to accommodate variations in dimensions of the conductor or helix.

It will be understood that, although twisting of the helix, by reason of the inner diameter of the latter being slightly less than the diameter of the conductor, is substantially prevented, even slight variations in the dimensions of the helix and conductor may permit some degree of twist to take place. This can be overcome by varying the position of the bobbin carrying the membrane, in relation to the cage 3, by arranging for the drive from the motor 21 to the sun and planet gear to be non-reversible and, by controlling it, either manually or automatically, it is possible to correct any tendency on the part of the helix to twist, merely by causing the bobbin to rotate in the appropriate direction.

In the arrangement shown in the Figures 2 and 3, the cage 3 is built up around a central hollow shaft 35 through which the oncoming conductor C is drawn by the capstan D. Shaft 35 provides the mounting for the cage at one end, being journalled to rotate in a bearing cap 4 on the post 5. At its other end the bearing is provided by an annular extension frame P having a shoulder or flange 30 carrying a bearing ring 6 journalled in the support stand 5'. Fast with the frame P is a gear wheel Q, by means of which drive is imparted to the cage 3, the gear wheel Q meshing with a pinion S fast on the shaft V, driven from suitable driving means T, e. g. an electric motor. The same drive means T can be used to rotate the capstan D and for this purpose a worm U is in constant mesh with a worm wheel U' fast on the end plate of the capstan.

A bracket 10 is supported by, or formed integrally with, the flange 30 and has guide pins 10' for positioning the membrane as it is laid down on the conductor C. There is also provided a member 9 for supporting and guiding the cable in its passage from the guide bracket 10 to the capstan D.

The drive to the carriage 12 supporting the bobbin is by means of a pinion 31 and thence through a train of gears 32 and 33 to a pinion 34 fast on the hollow shaft 35 which is solid with the cage 3. Pinion 34 meshes with a pinion 36 driven by an electric motor 20.

It will be obvious that normally the carriage 12 supporting the bobbin is held against rotation by the sun and planet gears 31, 32 and 33 as in the Figure 1 construction, pinion 33 being fast on the hollow shaft 35 and pinion 31 fast with the carriage.

As can be seen from Figure 2 the shaft of the electric motor 20 carries a pinion 36 which drives a second pinion 34 also fast on shaft 35 by which drive can be imparted to the bobbin carriage.

It will be understood that after the helix has been applied to a conductor in accordance with the invention, the covered conductor may be passed through a lapping head or other device, where, for example, dielectric or conductive tapes or an extruded sheath may be applied over the helix.

While the invention has been described and illustrated in relation to a machine which is horizontal, it can be applied to a machine with a vertical lay-out.

We claim:

1. A machine for applying a helical membrane to a conductor for use in the manufacture of a cable having an air space insulation comprising a cage mounted to revolve about an axis coincident with the centre line of the conductor, a carriage rotatably supported in the cage to rotate about an axis parallel to that of the conductor, a bobbin freely mounted on the carriage and provided with a length of unstretched membrane in helix form, a lapping head associated with the revolving cage by means of which the helix is drawn off the bobbin, as the cage revolves, and applied to the conductor with the turns extended to the required pitch.

2. A machine as claimed in claim 1 having a means controlling the rate of rotation of the carriage which includes a sun and planet gear, the axis of the sun gear being coincident with the axis of the conductor.

3. A machine as claimed in claim 2 including means for imparting drive to the sun and planet gear in order to vary the angular position of the carriage supporting the bobbin.

4. Procedure in manufacturing an electric conductor having an air space insulation including a helical membrane initially in the form of a closely wound helix having its turns substantially in contact and with a bore of a diameter less than the diameter of the conductor, consisting in advancing the conductor and in simultaneously longitudinally stretching said helix substantially in a path at an angle to the conductor to such an extent that the inner edge will be of a size and so disposed to tightly contact the conductor, in advancing the helix, and in lapping the helix while advancing and so stretched onto the conductor at the zone of intersection of said path with the advancing conductor.

References Cited in the file of this patent

UNITED STATES PATENTS

| | | |
|---|---|---|
| 250,392 | Rice et al. | Dec. 6, 1881 |
| 275,937 | Nute | Apr. 17, 1883 |
| 412,880 | Everson | Oct. 15, 1889 |
| 2,018,477 | Wentz | Oct. 22, 1935 |
| 2,645,590 | Mildner et al. | July 14, 1953 |

FOREIGN PATENTS

| | | |
|---|---|---|
| 608,147 | Great Britain | Sept. 10, 1948 |